United States Patent
Li et al.

(10) Patent No.: US 11,275,622 B2
(45) Date of Patent: Mar. 15, 2022

(54) UTILIZING ACCELERATORS TO ACCELERATE DATA ANALYTIC WORKLOADS IN DISAGGREGATED SYSTEMS

(71) Applicant: INTERNATIONAL BUSINESS MACHINES CORPORATION, Armonk, NY (US)

(72) Inventors: Min Li, San Jose, CA (US); John A. Bivens, Ossining, NY (US); Ruchi Mahindru, Elmsford, NY (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 16/204,653

(22) Filed: Nov. 29, 2018

(65) Prior Publication Data
US 2020/0174838 A1 Jun. 4, 2020

(51) Int. Cl.
*G06F 9/44* (2018.01)
*G06F 9/50* (2006.01)
(Continued)

(52) U.S. Cl.
CPC ............ *G06F 9/505* (2013.01); *G06F 9/3877* (2013.01); *G06F 9/5077* (2013.01); *G06F 9/545* (2013.01); *G06F 2209/5011* (2013.01)

(58) Field of Classification Search
CPC ...... G06F 9/505; G06F 9/3877; G06F 9/5077; G06F 9/545; G06F 2209/5011
See application file for complete search history.

(56) References Cited

U.S. PATENT DOCUMENTS 8,710,864 B2 4/2014 Dasu et al.
2010/0205602 A1* 8/2010 Zedlewski ............ G06F 9/5027
718/1

(Continued)

OTHER PUBLICATIONS

Yoshikawa et al., "Scalable Resource Disaggregated Platform That Achieves Diverse and Various Computing Services," NEC Technical Journal, vol. 9, No. 2, Special Issue on Future Cloud Platforms for ICT Systems, Jun. 2015 (7 pages).

*Primary Examiner* — Hang Pan
(74) *Attorney, Agent, or Firm* — Griffiths & Seaton PLLC

(57) ABSTRACT

Server resources in a data center are disaggregated into shared server resource pools, including an accelerator (e.g., FPGA) pool. Servers are constructed dynamically, on-demand and based on workload requirements, by allocating from these resource pools. According to this disclosure, accelerator utilization in the data center is managed proactively by assigning accelerators to workloads in a fine granularity and agile way, and de-provisioning them when no longer needed. In this manner, the approach is especially advantageous to automatically provision accelerators for data analytic workloads. The approach thus provides for a "micro-service" enabling data analytic workloads to automatically and transparently use FPGA resources without providing (e.g., to the data center customer) the underlying provisioning details. Preferably, the approach dynamically determines the number and the type of FPGAs to use, and then during runtime auto-scales the FPGAs based on workload.

14 Claims, 5 Drawing Sheets

(51) Int. Cl.
*G06F 9/38* (2018.01)
*G06F 9/54* (2006.01)

(56) References Cited

U.S. PATENT DOCUMENTS

| | | | |
|---|---|---|---|
| 2011/0131580 A1* | 6/2011 | Krishnamurthy | G06F 9/5038 |
| | | | 718/102 |
| 2011/0161972 A1* | 6/2011 | Dillenberger | G06F 9/5044 |
| | | | 718/104 |
| 2012/0110582 A1* | 5/2012 | Ferdous | G06F 9/5044 |
| | | | 718/101 |
| 2013/0007762 A1* | 1/2013 | Krishnamurthy | G06F 9/5044 |
| | | | 718/104 |
| 2014/0280687 A1 | 9/2014 | Egi et al. | |
| 2017/0295107 A1* | 10/2017 | Salapura | G06F 9/5083 |
| 2019/0065260 A1* | 2/2019 | Balle | H04L 41/0816 |

* cited by examiner

UTILIZING ACCELERATORS TO ACCELERATE DATA ANALYTIC WORKLOADS IN DISAGGREGATED SYSTEMS

BACKGROUND OF THE INVENTION

Field of the Invention

The present invention relates generally to data processing systems in a data center operating environment.

Description of the Related Art

A well-known information technology (IT) delivery model is software-based cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP.

The notion of "big data" refers to collections of data sets that are too large or complex for processing (e.g., analysis and visualization) using conventional database management tools or traditional data processing applications. While on-premises environments for processing such data sets exist, they are costly to provision and maintain, and thus many enterprises are looking to cloud-based or -supported analytic environments. To this end, it is also known to provide hardware-based high performance computing (HPC) environments that include accelerators, such as Field Programmable Gate Arrays (FPGAs), which have proven to be energy-efficient in handling certain data analytic workloads, such as machine learning, and the like. An FPGA is an array of logic gates that can be hardware-programmed to fulfill a specified task. In a hardware cloud environment, FPGA-based accelerators work in conjunction with a server's CPU to accelerate application and processing performance. Additional examples of accelerators include built-for-purpose Application Specific Integrated Circuits (ASICs), Central Processing Units (CPUs), or any other compute components which may advantage the processing of a given workload.

A hardware cloud can outperform a software cloud, e.g., by providing zero downtime and fast hardware replacement, as well as customized and on-line hardware reconfiguration. While the above-described hardware cloud-based approaches provide significant advantages and facilitate cloud-based processing of analytic workloads, currently accelerator-based resource provisioning in such clouds is done statically. This leads to low accelerator utilization. It also requires accelerator expertise to enable users to specify their resource needs appropriately.

There remains a need to provide enhanced techniques to provision and scale accelerators dynamically for data analytic workloads in a cloud-based environment.

BRIEF SUMMARY

According to a first aspect of this disclosure, a method for processing a workload in a compute environment having a pool of accelerators is described. The method begins upon receiving a request to process the data analytic workload. In response to receipt of the request, an accelerator configuration (or "allocation") anticipated to be required to process the data analytic workload is determined. The accelerator configuration comprises a set of accelerator requirements (e.g., a number and type of accelerator). Based on the set of accelerator requirements, available accelerators drawn from the accelerator resource pool are then assigned to process the data analytic workload. As the workload is being processed by the accelerators assigned, the accelerator configuration is dynamically adjusted, preferably as determined by monitored resource consumption of the workload.

According to a second aspect of this disclosure, an system for processing a workload in a compute environment having a pool of accelerators is described. The system comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for processing a workload in a compute environment having a pool of accelerators is described. The computer program product holds computer program instructions executed in the data processing system and operative to perform operations such as the steps described above.

According to a fourth aspect of this disclosure, a data center facility is described. The data center facility comprises a set of server resource pools. The server resources pools comprise at least an accelerator resource pool. An accelerator sizing component executes in a hardware processor and is responsive to receipt of a request to process a workload to determine an accelerator configuration. The data center facility further includes at least one disaggregated compute system comprising accelerators selected from the accelerator resource pool to satisfy the accelerator configuration. An accelerator scaling component executes in a hardware processor and is responsive to receipt of resource consumption information as the workload is executing to scale-up or scale-down the accelerator configuration.

The approach of this disclosure improves accelerator utilization in a data center by assigning accelerators to workloads in a fine granularity and agile way, and de-provisioning them when no longer needed. In this manner, the approach is especially advantageous to automatically provision accelerators for data analytic workloads. The approach thus provides for a "micro-service" enabling data analytic workloads to automatically and transparently use accelerator resources without providing (e.g., to the customer) the underlying provisioning details. Preferably, the approach dynamically determines the number and the type of accelerators to use, and then during runtime auto-scales the accelerators based on workload.

Thus, according to this technique accelerator resources are allocated in a fine grain and dynamic manner, preferably based on application (workload) characteristics. When the workload does not need accelerators during the execution, these resources are re-allocated to other workloads. Preferably, when the auto-scaling component determines that accelerators can be de-allocated, those accelerators are first returned to the accelerator resource pool so that they then become available to support other workload(s) being processed by the hardware cloud. The fine-grained accelerator allocation is not limited to reducing accelerator resources. Indeed, there may be circumstances during the runtime when the system determines the accelerator configuration determined by the accelerator sizing component is inadequate. Generalizing, the system dynamically increases or decrease the number of accelerators during the workload executions. The approach herein provides for dynamic accelerator resource allocation in a disaggregate system by adding and removing accelerators based on application needs.

Preferably, the data center in which the techniques are implemented comprises a set of server resource pools. A disaggregated compute system to process a workload comprises processors selected from the compute pool, computer memories selected from the memory pool, accelerators selected from the accelerator resource pool, and preferably an optical interconnect.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator (e.g., FPGA) pool, a storage pool, and so forth. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

By way of background, but not by way of limitation, the following describes a representative computer environment in which the techniques of this disclosure (described below) may be practiced.

Figure 1:
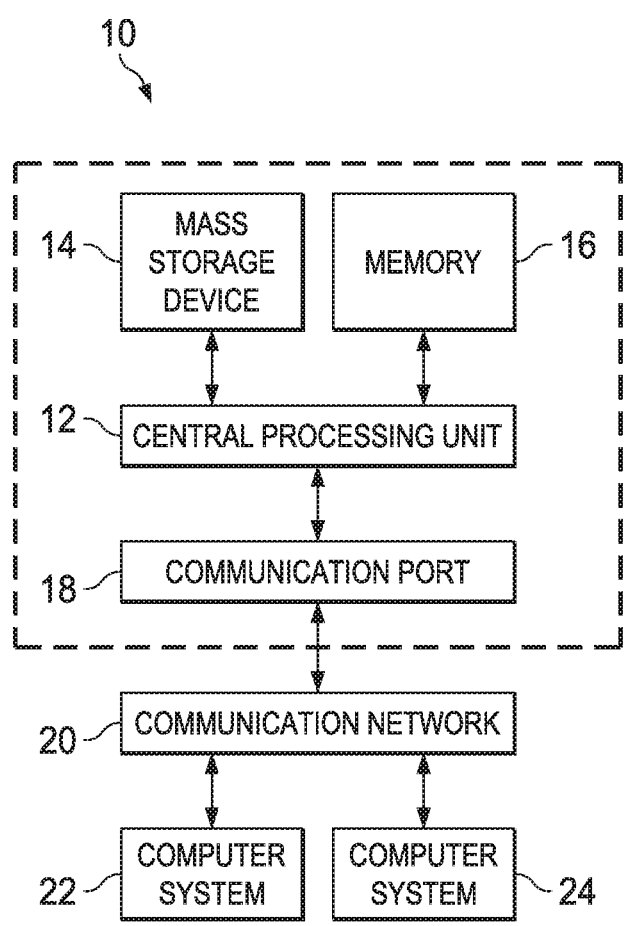
FIG. 1 depicts an exemplary block diagram illustrating a computing system environment in which exemplary aspects of the disclosure may be implemented.

Turning now to FIG. 1, exemplary architecture 10 of a general computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

It is understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the IBM Security Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 2:
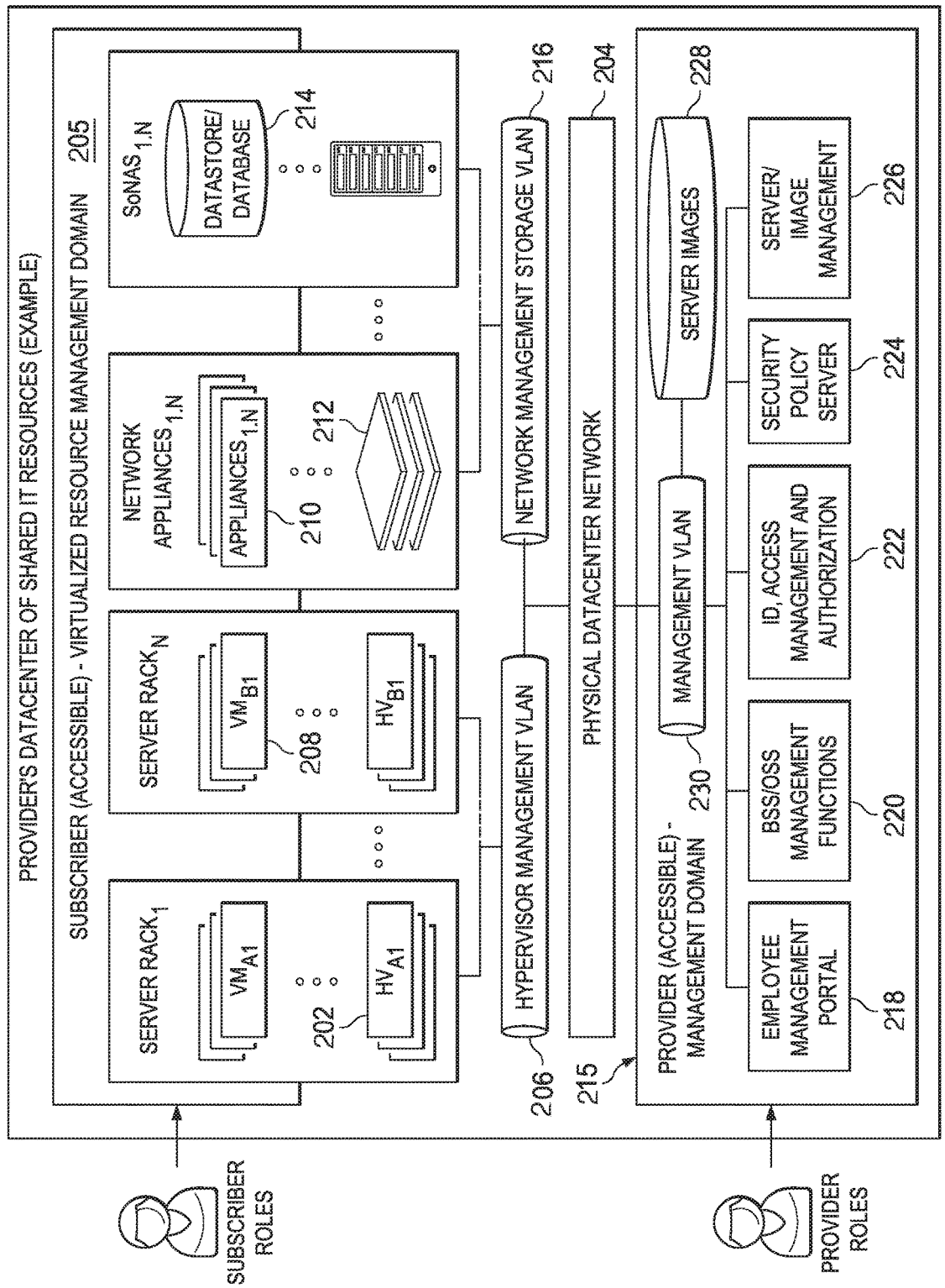
FIG. 2 depicts a datacenter architecture according to this disclosure.

FIG. 2 illustrates a typical IT infrastructure in accordance with the cloud computing model description as previously provided. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 2, an example virtual machine hosting environment (alternately referred to herein as a data center or "cloud") is illustrated. This environment comprises host machines (HVs) 202 (e.g., servers or like physical machine computing devices) connected to a physical datacenter network 204, typically via a hypervisor management VLAN 206. Although not depicted explicitly, typically the environment also includes load balancers, network data switches (e.g., top-of-rack switches), firewalls, and the like. As shown in FIG. 2, physical servers 202 are each adapted to dynamically provide one or more virtual machines (VMs) 208 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 210 are hosted in network appliances 212, and tenant data is stored in data stores and databases 214. The applications and data stores are connected to the physical datacenter network 204, typically via a network management/storage VLAN 216.

Collectively, the virtual machines, applications and tenant data represent a subscriber-accessible virtualized resource management domain 205. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 215. This domain comprises a provider employee management portal 218, the BSS/OSS management functions 220, various identity and access management functions 222, a security policy server 224, and management functions 226 to manage the server images 228. These functions interface to the physical datacenter network via a management VLAN 230. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

Utilizing Accelerators to Accelerate Data Analytic Workloads

With the above description providing several representative operating environments, the techniques of this disclosure are now described. In a preferred embodiment, the techniques are implemented within a hardware cloud environment, such as a disaggregated compute system wherein server resources in or across the data center are "disaggregated" into shared server resource pools, namely, one or more of: a compute pool, a memory pool, an accelerator pool, a storage pool, and the like. Servers are constructed dynamically, for example, on-demand and based on workload requirements, by allocating from these resource pools. A disaggregated compute system of this type keeps track of resources that are available in the shared server resource pools, and manages those resources based on that information.

Figure 3:
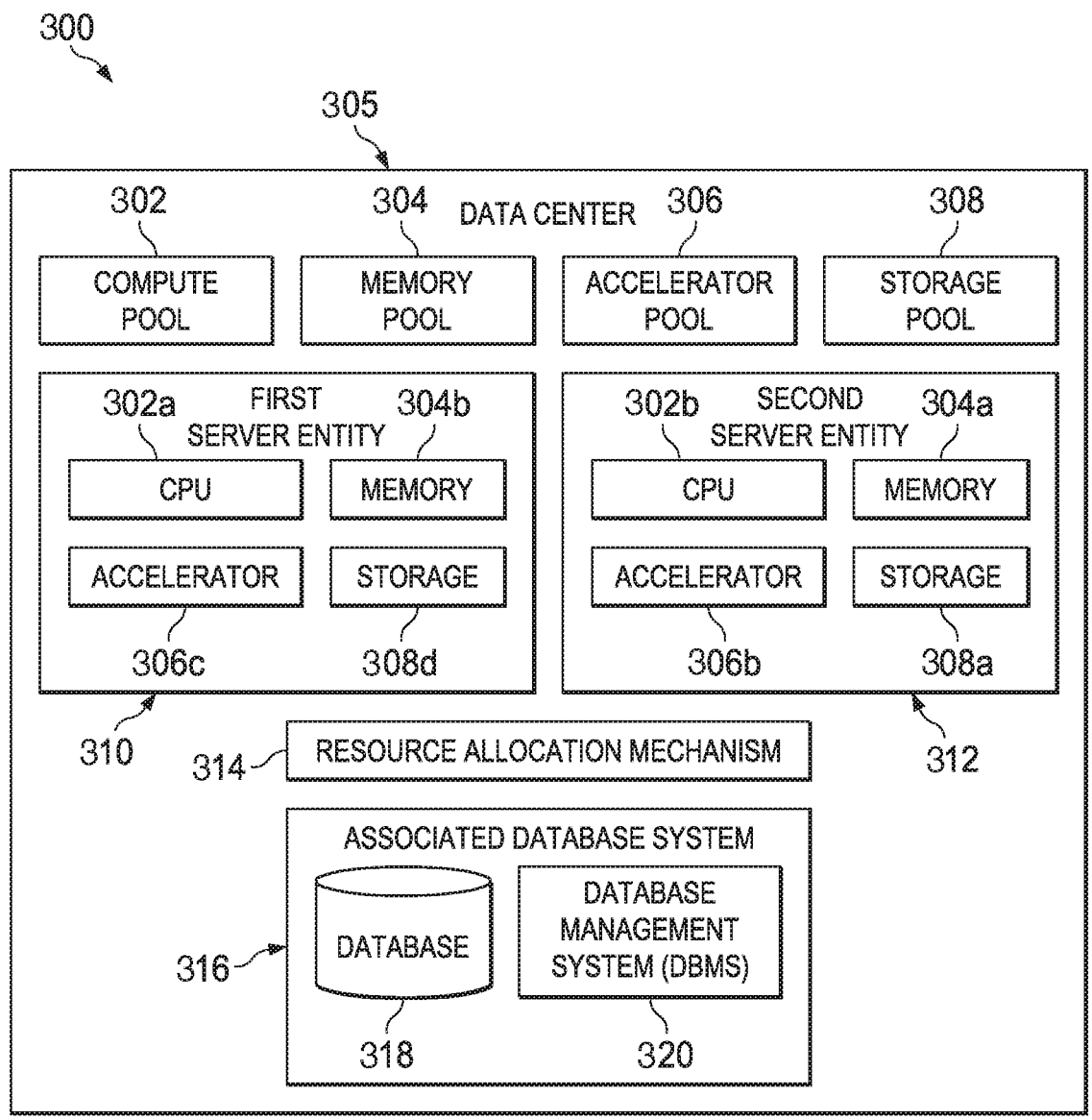
FIG. 3 depicts an additional data center architecture in which the techniques of this disclosure may be implemented.

A representative disaggregated compute system 300 is shown with reference now to FIG. 3. In one embodiment, the disaggregated compute system 300 is configured within a data center 305. In the disaggregated compute system 300, there are shared server pools, e.g., a compute pool 302, a memory pool 304, an accelerator pool 306, a storage pool 308, and perhaps others. There may be a single instance of a resource pool, or multiple such instances (sometimes referred to as "multiple pools"). In the approach, particular servers that service customer workloads are constructed dynamically, for example, on-demand and based on workload requirements, by allocating from these resource pools. Thus, for example, a first server entity 310 may comprise CPU 302a (selected or otherwise obtained from compute pool 302), memory 304b (selected or otherwise obtained from memory pool 304), accelerator 306c (selected or otherwise obtained from accelerator pool 306), and storage 308d (selected or otherwise obtained from storage pool 308). A second server entity 312 may comprise CPU 302b, memory 304a, accelerator 306b and storage 308a. These examples are merely representative. The particular server pool resources that comprise a given server entity may change (in substantially real-time).

Preferably, once a particular resource of a resource pool (e.g., an FPGA accelerator) is associated with a given server entity, that particular resource is not available to be used to constitute another server entity. Stated another way, preferably an allocated resource (or at least a portion thereof) of a resource pool remains associated with the server entity until it is de-allocated, at which point the resource is returned back to the resource pool and can be used again by another server entity. Although not intended to be limiting, preferably a server entity (once created) is associated with one data center customer (tenant). In other words, server entities preferably are not shared across tenants.

To manage such allocations and de-allocations, the disaggregated compute system 300 has the capability to keep track of resources that are available in the shared server resource pools and that are allocated or de-allocated to the various server entities. To this end, the disaggregated compute system 300 comprises (or has associated therewith) a tracking system comprising a resource allocation mechanism 314, and an associated database system 316. Generally, the tracking system is implemented as a data processing system, and it may operate in a standalone manner or as a component of some other system or functionality in the data center.

Typically, the resource allocation mechanism 314 is implemented in software, namely, as set of computer program instructions, executing in one or more hardware processors. The resource allocation mechanism 314 may comprise one or more sub-systems or modules, processes, programs or execution threads, and such components may be co-located or distributed. The resource allocation mechanism 314 generally is responsible for executing one or more allocation algorithms that create and manage server entities. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources to the existing server entity when less capacity is needed to handle the workload. One or more of such functions may be combined, and other types of algorithms may be implemented by the resource allocation mechanism 314.

The one or more algorithms that comprise the resource allocation mechanism 314 used information stored in the database system 316 to carry out the management functions. As noted above, the database system 316 stores information that tracks the state, status or other properties and attributes of the various resources in the shared server pools. In addition, preferably the database stores information about each server entity built by the resource allocation mechanism. Generalizing, and as well-known, the database system 316 comprises a database 318, namely, a collection of data organized in one or more ways (e.g., via schemas, tables, queries, report, views and other objects), together with a database management system (DBMS) 320, which is a computer software application that interacts with the user, other applications, and the database to capture and analyze data. A general purpose DBMS enables the definition, creation, querying, update and administration of databases.

In one embodiment, the database 318 is relational. The database stores a data record (or, more generally, a data set) that, for each defined server entity, identifies the resources that comprise the server. Preferably, the data record is associated with an identifier, a unique server ID, and each resource that comprises the server is associated in the database with that unique server identifier. Thus, continuing with the example described above, the first server entity 310 may be associated with unique server $ID_1$, while the second server 312 may be associated with user server $ID_2$, and so forth.

Preferably, the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 302a, memory 304b, FPGA accelerator 306c and storage 308d are associated (by relational tables or otherwise) with unique server ID1, which is the unique server identifier for the first server entity 310. Likewise, and continuing with the second example, the various resource-specific identifiers for the CPU 302b, memory 304a, FPGA accelerator 306b and storage 310a are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

As noted above, there may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 314 and the database system 316 work together to manage the disaggregated compute system. The resource allocation mechanism functions as a tracking system that keeps track of idle and used CPUs, memory, FPGA accelerator and other components that define a server. Additionally, the tracking system keeps a record for each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

The algorithms used for resource selection (new server allocation, server scale-up and server scale-down) can use common criteria to facilitate the selection, or these algorithms can differ from one another, e.g., based on the resource topology and the purpose of resource allocation. When resources are interconnected, more flexibility in allocated resources is available to the system. For resources that are not directly interconnected, preferably the algorithm(s) consider the hierarchy of resources, as well as other factors, such as number of hops, latency, cost and so forth. In the latter case, preferably the algorithm tries to minimize the number of hops.

With the above as background, the techniques of this disclosure are now described.

According to this disclosure, FPGAs (or other accelerators/types of accelerators) from an accelerator pool are dynamically provisioned and scaled, e.g., to handle data analytic workloads in a hardware cloud.

Figure 4:
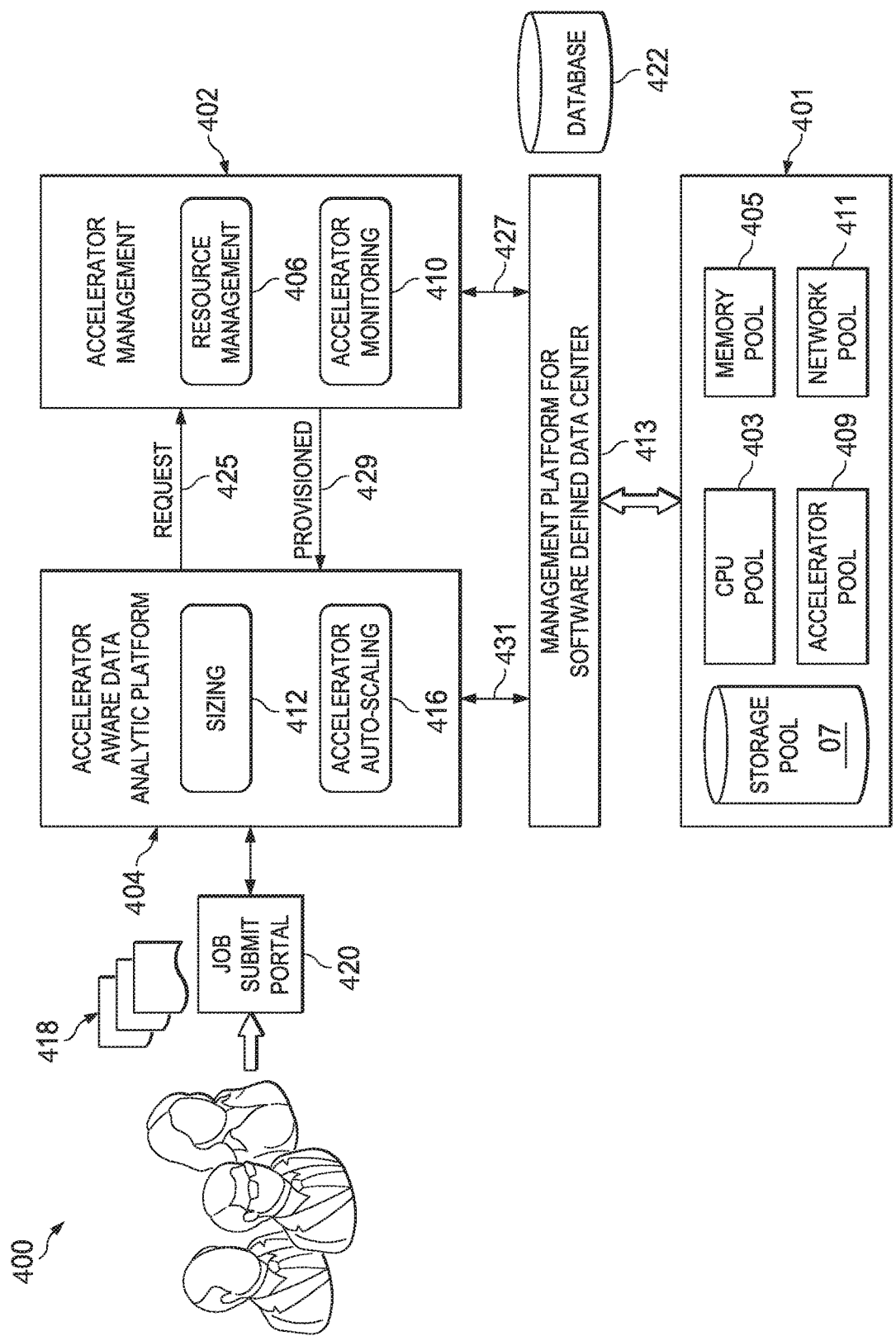
FIG. 4 depicts an accelerator provisioning and scaling system according to this disclosure.

FIG. 4 depicts a representative embodiment of an accelerator provisioning and scaling system that implements this functionality. As depicted, and again as background, the data center 401 comprises the various sets of resource pools, such as CPU pool 403, memory pool 405, storage pool 407, accelerator pool 409 and network pool 411. These pools comprise the different types of resources from which a server is provisioned. A management platform 413 (e.g., IBM Cloud OpenStack Services) may provide an application programming interface (API) to these data center resource pools. According to this disclosure, the accelerator management and scaling system 400 preferably comprises several sub-systems, accelerator resource management components 402, and an accelerator-aware data analytic platform 404.

The accelerator management components 402 comprise an accelerator resource management module 406, which allocates and de-allocates accelerator resources from the accelerator pool 409. The components 402 also include an accelerator monitoring module 410, which keeps track of the health status and resource utilization of the accelerator resources that are provisioned. The accelerator-aware data analytic platform 404 comprises an accelerator sizing module 412, which decides the number and type of accelerators to use for a particular workload. There may be one or more accelerator types, such as Field Programmable Gate Arrays (FPGAs), or the like. Further, the platform 404 includes an accelerator auto-scaling module 416, which retrieves monitoring information from the accelerator monitoring module 410 and auto scales-up or -down the accelerator resources in a fine granularity given the capability of the hardware cloud, changes to the workload, and the like, as will be described below.

A workload 418 to be processed typically is a data analytic workload, although the particular type of workload is not a limitation of this disclosure. The workload 418 may be submitted for processing manually, e.g., via job submission portal 420, or programmatically, via an API or other interface. A workload database 422 associated with the data analytic platform 404 stores information about one or more other workloads that have been processed by the system. For a given workload, the workload database preferably also stores certain information including, without limitation, one or more of: workload characteristics, the jar (or other file type) file comprising the workload itself, data that has been collected (e.g. by the accelerator monitoring component) about prior accelerator allocations/de-allocations, data about the accelerator-friendliness of the workload, data size, execution time, and so forth. In addition, the workload database 422 may store still other information from which accelerator sizing determinations can be made, e.g., one or more accelerator-performance models. Further, the workload database 422 may provide one or more sizing "templates" that may be used for provisioning default or base-level accelerator configurations (allocations). Thus, a particular workload that has been processed by the system (or that represents a default) has an associated workload profile.

The particular number of accelerators and their type(s) that comprise an accelerator configuration may vary depending on the requirements of a workload to be processed. The type(s) and number(s) of accelerators are sometimes referred to herein as "accelerator requirements." The accelerator requirements may be influenced by one or more other factors, such as cost, latency, and the like. A basic goal of the system is to select the accelerators (from the accelerator resource pool) that match (e.g., according to some "best fit" criteria) the accelerator requirements that are determined for the data analytic workload, and then to dynamically adjust the accelerator configuration (allocation) as required during runtime processing of the data analytic workload.

Preferably, a set of commonly-used accelerator types are maintained with the accelerator pool. As noted above, a commonly-used accelerator type may be one that is based on workload types that are commonly seen, e.g., as tracked in the workload database 422 or otherwise pre-configured by default. In another embodiment, a set of different types of accelerator pools are pre-configured so that provisioning times are significantly reduced, e.g., as compared to the case when accelerators need to re-configured and provisioned on-the-fly.

When provisioning accelerators, there may not be a known workload model that can be used (e.g., because the system has not processed a workload of this type). If a suitable model or template is not available, it may be desirable to execute the workload in one or more test runs, e.g., with a small sample of input data, with the resulting performance data obtained then used to train an application model that can be used thereafter for further accelerator provisioning. In some embodiments, a workload owner (e.g., a user submitting a given workload) may provide the accelerator requirements manually as an initial configuration. For example, the workload owner may have at least some idea of the type, number, and characteristics of accelerators best suited to the particular workload, and hence may provide this information to the system with or without executing the workload in a test run.

The system as described may provide additional accelerator management depending on characteristics of the workload. Thus, for example, if the workload is in a reduce intensive stage, the local memory of accelerators may be leveraged for reducing intermediate objects. To this end, preferably the system is able to determine (e.g., as a CU_num value) an optimal number of replicated kernel pipelines. By managing the right number of replicated kernel pipelines, resource utilization of accelerators is improved while still avoiding resource contention issues. The determination of the optimal number of replicated kernel pipelines may be performed by the accelerator sizing module, the accelerator resource management module, or some other component. In an alternative embodiment, that information is received from a component external to the system components described but then utilized as needed with respect to the accelerators.

Figure 5:
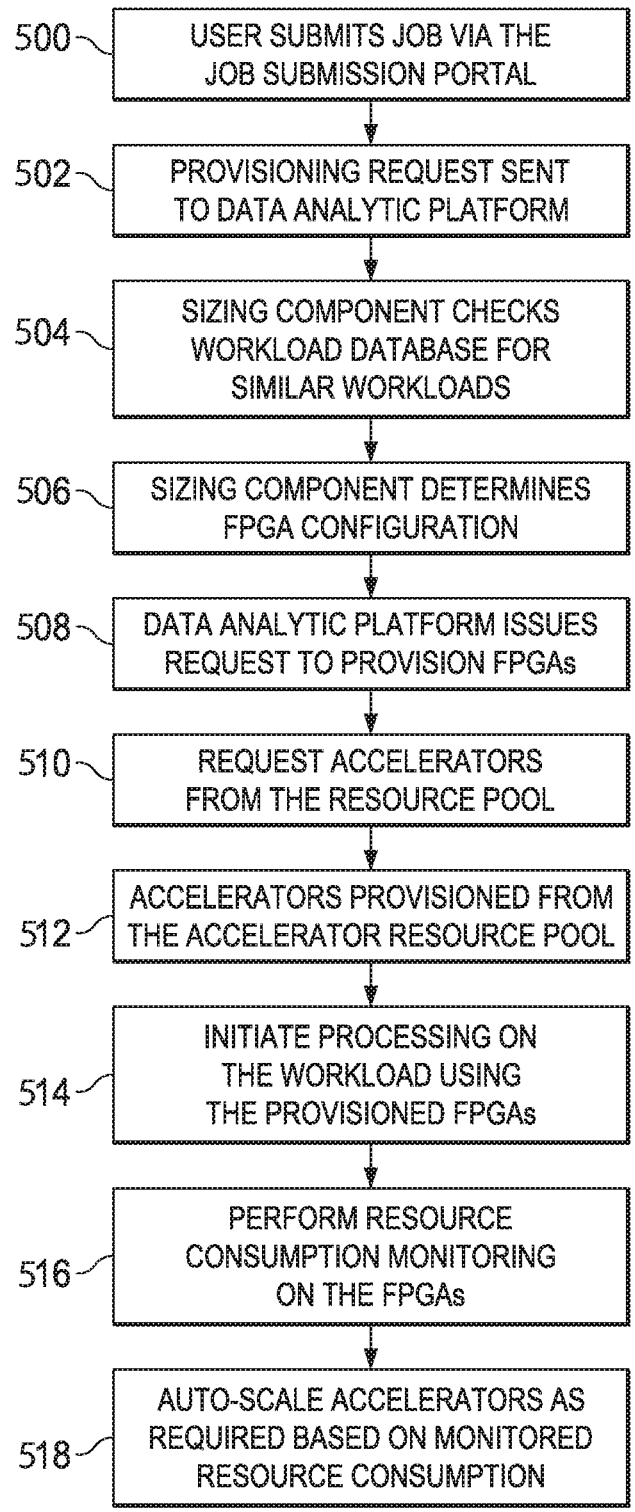
FIG. 5 depicts a process flow for an accelerator provisioning and scaling process according this disclosure.

FIG. 5 depicts how the system is used to provision and manage accelerator resources with respect to a workflow, such as a data analytic workload. As depicted in FIG. 5, at step 500 a user submits a job, e.g., via the job submission portal. The request typically includes various identifying characteristics for the workload, such as data size, desired execution time, and other data that might impact anticipated processing of the workload. At step 502, a request (asking for the provisioning details of the accelerators(s) to handle the workload) is sent to the accelerator-aware data analytic platform 404, where it is picked up by the accelerator sizing module 412. At step 504, the accelerator sizing component 412 checks the workload database 422 to determine whether the workload that is the subject of the current request is similar to (or shares other given characteristics) to one or more of the workloads that have been previously processed. The workload profile(s) stored in the workload database 422 may be used to facilitate this comparison.

In other words, preferably the system takes advantage of prior workload executions to find a "good fit" (of accelerator type and size) for the workload associated with the request at issue. Step 504 may also include the accelerator sizing component 412 carrying out test runs to decide whether the workload (associated with the new request) is accelerator-friendly. A workload may be considered to be accelerator-friendly if (based on its characteristics, the results of the test runs, and so forth) it is anticipated to work well in conjunction with a server's CPUs to accelerate application and processing performance, shorten computational cycles, etc.

The process then continues at step 506 with the accelerator sizing component 412 making a determination on how many accelerators, and what type of accelerator, are needed. In the data analytics context, a goal is to reduce the workload execution time. Thus, the particular determination about the number of accelerators (and their type) typically is deterministic once the nature and size of the workload is determined and evaluated against the workload profiles stored in the workload database 422 or otherwise considered via the test runs, or some combination of the existing workload profiles and the information that results from the test runs.

At step 508, data analytic platform issues a request (FIG. 4, at 425) to the accelerator management component 402 to provision the accelerators needed. In response, and at step 510, the accelerator resource management component 406 then issues a request (FIG. 4, at 427) via the management platform 413 in FIG. 4 to provision the accelerators from the accelerator resource pool 409 (and, as noted above, there may be different pools or sub-pools per accelerator type). The accelerators required are then provisioned from the resource pool at step 512. At step 514, processing on the workload is then initiated. At step 516, the accelerator monitoring initiates resource consumption monitoring from the provisioned accelerators. The information obtained by the accelerator monitoring component 410 informs the data analytic platform 404 about how well the accelerators provisioned for the workload are performing, e.g., whether they are keeping up with the workload requirements, whether the accelerators are under-provisioned, over-provisioned, or the like.

As noted above, one of the advantages of the accelerator provisioning system of this disclosure is the capability to respond dynamically to changes in the workload, and/or the data center itself. To this end, the accelerator auto-scaling module 414 operates to automatically scale-up and/or scale-down the number of accelerators used by the workflow, for example, based on the monitored resource consumption information provided by the accelerator monitoring component 410. To this end, information collected by the accelerator monitoring component 410 is communicated to the accelerator auto-scaling component 416, as depicted in FIG. 4 at 429. Based on the monitored information (and, optionally, information collected about the health and status of other resources in the cloud), the auto-scaling component 414 performs an auto-scaling computation, such as depicted in step 518 in FIG. 5. As a result of the computation, the accelerator auto-scaling component then instructs the management platform 413 (FIG. 4, 431) to scale-up or -down the accelerator resources being used for the workload.

The auto-scaling operation preferably is carried out continuously or periodically as the workload is processed. In the alternative, or as an adjunct to the continuous/periodic approach, the auto-scaling operation is carried out asynchronously, e.g. based on receipt of an event (e.g., an alarm, a notification from some other resource or system) or other occurrence in the compute cloud.

In one embodiment, one or more accelerators are monitored while processing a first data analytic workload. Based at least in part on the monitoring, an accelerator performance model is generated. That model may then be saved in the workload database and used to determine an accelerator configuration when a new data analytic workload request is received for processing. Alternatively, accelerator performance models may be pre-configured or provided by default from other sources.

Generalizing, the system preferably monitors the accelerator resources provisioned from initiation of the workload processing until that processing is complete, and those accelerator resources may then be allocated/de-allocated dynamically (by the auto-scaling component) "on-the-fly" to ensure the best fit for the circumstances. As noted above, preferably the goal of the processing is to carry out the workload over the shortest-possible workload execution time, but this factor may be influenced by one or more other considerations, such as execution cost, accelerator location, time-of-day, other resource availability constraints, combinations of these factors, etc. Thus, in certain circumstances it may be desirable to trade-off execution time for some other factor, and preferably the auto-scaling operation performs the allocation/de-allocation of accelerator resources using one or more scaling algorithms or processes. The particular algorithm that may be used is not a limitation of this disclosure.

Workload requirements may vary in time, and thus particular accelerators assigned for the job may not be needed throughout the duration of the job. The auto-scaling function adjusts for such changes dynamically, returning accelerators to the accelerator resource pool when they are no longer needed during the runtime processing.

As a further aspect, a particular workload (or some portion thereof) may be determined to be more FPGA-friendly than some other workload (or portion). In such case, the FPGA-friendly notion refers to the fact that the type of processing required by the workload (or task therein) is more suitable for FPGA processing than, say, processing in a central processing unit (CPU), or otherwise. In such case, FPGA-friendly workloads (or portions) would be assigned to the FPGAs, while the GPU-unfriendly workloads (or portions) would be assigned for processing elsewhere, e.g., by the CPUs. Thus, in one example embodiment, the hardware cloud comprises a set of FPGAs and a set of CPUs, and FPGA-friendly workloads are assigned to respective members of the set of FPGAs while FPGA-unfriendly workloads are assigned respective members of the set of CPUs. This notion of bifurcating FPGA-friendly and -unfriendly workloads (or workload portions) is advantageous, as it ensures that the least number of resources are applied to a particular compute requirement. Of course, and as noted above, the status of a workload as being "friendly" or "unfriendly" might well vary during the runtime execution of the job, and thus the auto-scaling feature adjusts the accelerator resources accordingly, in the manner described. Generalizing, another way of characterizing "friendliness" is the extent to which the workload is suitable for processing on the accelerators. A determination of such a value can then be included as one of the accelerator requirements.

One of ordinary skill will appreciate that the system as depicted in FIG. 4 may be configured using the individual components, but that this is not a requirement. One or more of the components depicted may be combined with one another, and these components may be co-located or operated in a distributed manner. The various sub-systems may communicate with one another over a network using any convenient transport mechanism or protocol, and these communications may be secured. Typically, each component comprises software (one or more programs or processes) executed on one or more hardware processors.

The actual allocation or de-allocation of the accelerators may be carried out by some other component in the system, e.g., the accelerator resource management component. Preferably, and as noted, the system allocates and de-allocates FPGAs during workload execution to provide a fine grain FPGA resource allocation capability in the hardware cloud.

Additional components (not shown) may also be included in the accelerator-aware data analytic platform. Thus, for example, a task-to-FPGA assignment component may be used to provide an additional degree of fine-grained control. The task-to-FPGA assignment component is consulted by the accelerator sizing component 412 during the initial provisioning operation (the determination of the number of FPGAs and their types) to assigns tasks within a workload to given FPGAs, e.g., based on workload characteristics, a task scheduling policy, or the like. The accelerator auto-scaling component may also consult with the task-to-FPGA component as the auto-scaling operation(s) are performed by the auto-scaling component. Generalizing, both the initial allocation and any modifications to the accelerator allocation may take into consideration the information provided by the task-to-FPGA assignment component when it is used. Such information may or may not accompany the workflow request. When such information is available, it may be used to inform the system about which tasks in the workflow may be off-loaded (in that they represent FPGA-friendly computations or may otherwise benefit from FPGA-specific processing).

As can be appreciated, the system of this disclosure preferably operates by provisioning and modifying accelerator configurations based on workload needs, as opposed to assigning workloads to accelerators statically. The approach provides for efficient accelerator provisioning and fine-grained scaling, thereby enhancing the performance of the hardware cloud, and reducing cost. With this approach, neither the cloud provider nor the customer needs to be worried about accelerators being over-provisioned. Within the disaggregated data center, accelerators can be easily and flexibly provisioned and de-provisioned from the accelerator resource utilization pool. The approach provides an illusion of infinite accelerator resources, which can be accessed and used in a highly-efficient and performant manner, e.g., through a high-bandwidth, low latency optical switch and from anywhere within the data center.

The approach improves accelerator utilization by assigning accelerators to workloads in a fine granularity and agile way, and de-provisioning them when no longer needed. In this manner, the approach is especially advantageous to automatically provision FPGAs for data analytic workloads. The approach thus provides for a "micro-service" enabling data analytic workloads to automatically and transparently use FPGA resources without providing (e.g., to the customer) the underlying provisioning details. As noted, the approach dynamically determines the number and the type of FPGAs to use, and then during runtime auto-scales the FPGAs based on workload.

Thus, according to this technique accelerator resources are allocated in a fine grain and dynamic manner, preferably based on application (workload) characteristics. When the workload does not need FPGAs during the execution, these resources are re-allocated to other workloads. Preferably, when the auto-scaling component determines that FPGAs can be de-allocated, those FPGAs are first returned to the accelerator resource pool so that they then become available to support other workload(s) being processed by the hardware cloud.

Stated another way, the hardware cloud accelerator pool supports dynamic (accelerator) attach and detach capability during the workload execution. As also noted, preferably the accelerator pool supports direct memory access (DMA), as well as zero copy for accelerator computation.

The fine-grained accelerator allocation is not limited to reducing FPGA resources of course. Indeed, there may be circumstances during the runtime when the system determines the accelerator configuration determined by the accelerator sizing component is inadequate. Generalizing, the system dynamically increases or decrease the number of accelerators during the executions. Preferably, the number of accelerators and the number of accelerators are reconfigured during the workload execution within a microsecond-level latency. As will be appreciated, the approach herein provides for dynamic accelerator resource allocation in a disaggregate system, e.g., by adding and removing FPGAs based on application needs.

The techniques described herein provide further significant advantages. They enable initial accelerator resources to be appropriately allocated based on projected need, and dynamic scale-up or scale-down of physical capacity without any downtime, and with minimal or no customer impact. Because a server entity preferably is built-up from allocation of a subset of accelerators, only those resources that are needed to handle the workload are used. Further, when scale-up is required, the system obtains the additional accelerator resources needed, preferably based on locality considerations (i.e., where the additional accelerator resources are) to ensure continued good performance at low cost. Because the approach leverages disaggregated servers, these advantages are enable the data center to realize greater modularity, higher resource utilization, lower costs, and better performance. Indeed, with the emergence of larger data centers and the need for clouds of ever-larger numbers of servers, the approach provides a way for a data center that processes data analytic workloads to operate in a much more cost-effective and reliable manner. Thus, e.g., server entities using FPGAs are built as needed, and the FPGA resources that comprise these entities are varied dynamically as needed. By using shared accelerator resource pools and the accelerator resource allocation methods described herein, the accelerator-based servers are constructed dynamically and on-demand by allocating from these resource pools according to the workload's requirements.

The advantages described herein are provided for by maintaining and using the various accelerator resource server pools, and the accelerator resource allocation mechanism that enables generation and management of the server entities in the manner described. An embodiment of such an approach that further includes the accelerator sizing and accelerator scaling components enables the system to provide more robust inventory management over the server resource pools, and to ensure that the accelerator scale-up and scale-down algorithms work more efficiently. A still further embodiment of such an approach that also uses the task-to-FPGA assignment component provides still additional advantages, as it ensures that the FPGA resources that are provisioned are more closely-aligned with the actual tasks that need them.

The approach herein differs from traditional data centers wherein accelerators are directly connected to each individual physical machine. By organizing accelerators in a separate dedicated accelerator pool (or sub-pool), the accelerators access allocated memory directly without copying any data, which greatly reduces bandwidth consumption and increases performance. Moreover, the components described above flexibly allocated accelerators to any processors within a rack without incurring network communication overhead, as preferably the provisioned accelerators are in the same resource pool.

The accelerators that comprise the accelerator pool may be of varying types and programmed for different usages. A typical FPGA exhibits low latency, and is computationally- and power-efficient, with algorithms therein being implemented in hardware (rather than software). As noted, a typical workload for an FPGA may vary widely, e.g., it the workload may involve, without limitation, digital signal processing, medical imaging, speech recognition, radar processing, machine learning, and many others. Representative commercial products of this type include, without limitation, Xilinx® MicroBlaze™, and others, such as provided from Altera®. FPGAs are quite flexible and can process irregular computations, e.g., irregular graph computation for a machine learning workload. Multiple FPGAs may be integrated into a single package.

Preferably, the accelerator pool comprises various FPGAs programmed and configured for various purposes, wherein a particular purpose might be tailored to a given need of an application. Thus, an accelerator pool may comprise sub-pools (or, more generally, subsets) of accelerators, e.g., machine learning FPGAs, speech recognition FPGAs, medical imaging FPGAs, and so forth. While this approach of using special purpose FPGAs is preferred, it is not meant to be limiting, as an accelerator may be re-programmed to meet a particular demand within the data center, especially as such demands vary over time.

In a specific implementation, a framework such as Open Computing Language (OpenCL) may be used to program different types of accelerators and thereby support seamless switching between accelerators (e.g., of different sizes and types). As also noted above, replicating kernel pipelines and executing them concurrently can improve the resource utilization of FPGAs drawn from the accelerator pool and, as a consequence, improve application performance. In certain circumstances it may be desired to reduce resource consumption of a single pipeline by moving some circuit-expensive computations to external compute units while fixing more concurrent pipelines into an FPGA.

As has been described, the functionality described above may be implemented as a standalone approach, e.g., a software-based function executed by a processor, or it may be available as a service (including as a web service via a SOAP/WL interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server including both a hardware cloud (a preferred embodiment), as well as an adjunct (or retrofit) to a software-based cloud. Further, while some of the functionality disclosed herein has been referenced in terms of using an FPGA, it should be appreciated that any accelerator type (e.g., CPU, ASICs, etc.) may be used in an actual implementation of the disclosed embodiments.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to data analytic workload management schemes, such as described above.

A variant of this approach is to use the above-described techniques to provision and manage other resource types, such as CPUs, or a combination of FPGAs-CPUs that may be used to service a particular workload.

As noted, the approach may also be implemented in other than a disaggregated compute environment, such as a conventional data center providing bare metal servers, virtual servers, or combinations thereof. A typical implementation will be a set of bare metal servers provisioned with FPGA hardware.

As noted above, there is no limitation on nature and type of workload that may be processed, although typically the approach is used to complex compute-intensive analytic workloads, as has been described.

The technique herein may be used for other types of accelerators, such as specialty chips with circuits that mimic brain operation for cognitive processing, quantum computing devices that accelerate special complex computations, and the like.

The invention claimed is:

1. A method for dynamically provisioning and scaling accelerators for data analytic workloads in a disaggregated computing system, comprising:
   receiving a request to process a data analytic workload;
   responsive to receipt of the request, dynamically determining an accelerator configuration anticipated to be required to process the data analytic workload, the accelerator configuration comprising a set of accelerator requirements, wherein determining the accelerator configuration further comprises determining a first portion of the data analytic workload is most suitable for processing by one or more Field Programmable Gate Arrays (FPGAs) and a second portion of the data analytic workload is most suitable for processing by one or more Central Processing Units (CPUs);
   responsive to determining the accelerator configuration, instantiating in real-time, a dynamically constructed server entity composed of individual components selected from a plurality of resource pools each physically maintaining a plurality of like-typed resources therein, the plurality of resource pools including at least a compute pool having the one or more CPUs, a memory pool, and an accelerator pool having the one or more FPGAs;
   based on the set of accelerator requirements, assigning available accelerators from the accelerator pool that match the set of accelerator requirements to the dynamically constructed server entity executing the data analytic workload;
   as the data analytic workload is being processed by the assigned accelerators, dynamically adjusting a number of individual accelerators from the accelerator pool provisioned to the dynamically constructed server entity to perform the data analytic workload as determined by monitoring resource consumption during a progression of the data analytic workload, wherein the adjusting of the number of individual accelerators provisioned to the dynamically constructed server entity is performed, at least in part, according to a determination that the first portion or the second portion of the data analytic workload has varied from being most suitably processed by the one or more FGPAs or the CPUs; and
   grouping accelerators in the accelerator pool into one or more preassigned groups of accelerators, wherein a particular group is preconfigured to process a particular type of data analytic workload prior to assigning any of the one or more preassigned groups of accelerators to process a subsequent data analytic workload of the particular type, and wherein provisioning of the accelerators to process the data analytic workload of the particular type is performed according to an analyzation of an efficiency of those accelerators selected for the particular group to process the data analytic workload of the particular type as compared to being processed by alternative accelerators in the pool of accelerators.

2. The method of claim 1, further including:
   monitoring accelerators during processing of a first data analytic workload;
   using information derived from the monitoring to generate a model of accelerator performance; and
   using the accelerator performance model to determine an accelerator configuration for a second data analytic workload having an application type similar to an application type associated with the data analytic workload.

3. The method of claim 1, wherein the accelerator configuration comprises a number of accelerators, and one or more types of accelerator.

4. The method of claim 1, wherein the set of accelerator requirements also include a value representing an extent to which the workload is suitable for processing on the accelerators.

5. The method of claim 1, wherein the one or more FGPAs are selected from a set of FGPAs, wherein at least one subset of the set of FGPAs is programmed according to a type of workload.

6. The method of claim 1, wherein the accelerator configuration is dynamically adjusted based on a determined number of replicated kernel pipelines.

7. A system for dynamically provisioning and scaling accelerators for data analytic workloads in a disaggregated computing system, comprising:
   one or more hardware processors;
   computer memory holding computer program instructions executed by the hardware processors and operative to:
   receive a request to process a data analytic workload;
   responsive to receipt of the request, dynamically determine an accelerator configuration anticipated to be required to process the data analytic workload, the accelerator configuration comprising a set of accelerator requirements, wherein determining the accelerator configuration further comprises determining a first portion of the data analytic workload is most suitable for processing by one or more Field Programmable Gate Arrays (FPGAs) and a second portion of the data analytic workload is most suitable for processing by one or more Central Processing Units (CPUs);
   responsive to determining the accelerator configuration, instantiate in real-time, a dynamically constructed server entity composed of individual components selected from a plurality of resource pools each physically maintaining a plurality of like-typed resources therein, the plurality of resource pools including at least a compute pool having the one or more CPUs, a memory pool, and an accelerator pool having the one or more FPGAs;

based on the set of accelerator requirements, assign available accelerators from the accelerator pool that match the set of accelerator requirements to the dynamically constructed server entity executing the data analytic workload;

as the data analytic workload is being processed by the assigned accelerators, dynamically adjust a number of individual accelerators from the accelerator pool provisioned to the dynamically constructed server entity to perform the data analytic workload as determined by monitoring resource consumption during a progression of the data analytic workload, wherein the adjusting of the number of individual accelerators provisioned to the dynamically constructed server entity is performed, at least in part, according to a determination that the first portion or the second portion of the data analytic workload has varied from being most suitably processed by the one or more FGPAs or the CPUs; and group accelerators in the accelerator pool into one or more preassigned groups of accelerators, wherein a particular group is preconfigured to process a particular type of data analytic workload prior to assigning any of the one or more preassigned groups of accelerators to process a subsequent data analytic workload of the particular type, and wherein provisioning of the accelerators to process the data analytic workload of the particular type is performed according to an analyzation of an efficiency of those accelerators selected for the particular group to process the data analytic workload of the particular type as compared to being processed by alternative accelerators in the pool of accelerators.

8. The system of claim 7, wherein the computer program instructions are further operative to:
monitor accelerators during processing of a first data analytic workload;
use information derived from the monitoring to generate a model of accelerator performance; and
use the accelerator performance model to determine an accelerator configuration for a second data analytic workload having an application type similar to an application type associated with the data analytic workload.

9. The system of claim 7, wherein the accelerator configuration comprises a number of accelerators, and one or more types of accelerator.

10. The system of claim 7, wherein the set of accelerator requirements also include a value representing an extent to which the workload is suitable for processing on the accelerators.

11. The system of claim 7, wherein the one or more FGPAs are selected from a set of FGPAs, wherein at least one subset of the set of FGPAs is programmed according to a type of workload.

12. The system of claim 7, wherein the computer program instructions are further operative to dynamically adjust the accelerator configuration based on a determined number of replicated kernel pipelines.

13. A computer program product in a non-transitory computer readable medium for use in a data processing system for dynamically provisioning and scaling accelerators for data analytic workloads in a disaggregated computing system, the computer program product holding computer program instructions executed in the data processing system and operative to:
receive a request to process a data analytic workload;
responsive to receipt of the request, dynamically determine an accelerator configuration anticipated to be required to process the data analytic workload, the accelerator configuration comprising a set of accelerator requirements, wherein determining the accelerator configuration further comprises determining a first portion of the data analytic workload is most suitable for processing by one or more Field Programmable Gate Arrays (FPGAs) and a second portion of the data analytic workload is most suitable for processing by one or more Central Processing Units (CPUs);
responsive to determining the accelerator configuration, instantiate in real-time, a dynamically constructed server entity composed of individual components selected from a plurality of resource pools each physically maintaining a plurality of like-typed resources therein, the plurality of resource pools including at least a compute pool having the one or more CPUs, a memory pool, and an accelerator pool having the one or more FPGAs;
based on the set of accelerator requirements, assign available accelerators from the accelerator pool that match the set of accelerator requirements to the dynamically constructed server entity executing the data analytic workload;
as the data analytic workload is being processed by the assigned accelerators, dynamically adjust a number of individual accelerators from the accelerator pool provisioned to the dynamically constructed server entity to perform the data analytic workload as determined by monitoring resource consumption during a progression of the data analytic workload, wherein the adjusting of the number of individual accelerators provisioned to the dynamically constructed server entity is performed, at least in part, according to a determination that the first portion or the second portion of the data analytic workload has varied from being most suitably processed by the one or more FGPAs or the CPUs; and
group accelerators in the accelerator pool into one or more preassigned groups of accelerators, wherein a particular group is preconfigured to process a particular type of data analytic workload prior to assigning any of the one or more preassigned groups of accelerators to process a subsequent data analytic workload of the particular type, and wherein provisioning of the accelerators to process the data analytic workload of the particular type is performed according to an analyzation of an efficiency of those accelerators selected for the particular group to process the data analytic workload of the particular type as compared to being processed by alternative accelerators in the pool of accelerators.

14. The computer program product of claim 13, wherein the computer program instructions are further operative to:
monitor accelerators during processing of a first data analytic workload;
use information derived from the monitoring to generate a model of accelerator performance; and
use the accelerator performance model to determine an accelerator configuration for a second data analytic workload having an application type similar to an application type associated with the data analytic workload.

\* \* \* \* \*